(12) United States Patent
Lang et al.

(10) Patent No.: US 11,176,807 B2
(45) Date of Patent: Nov. 16, 2021

(54) UNMANNED SYSTEM (US) FOR SMOKE DETECTOR TESTING

(71) Applicant: Honeywell International Inc., Morris Plains, NJ (US)

(72) Inventors: Scott Lang, Geneva, IL (US); Johan Vossen, Grace-Hollogne (BE); Rich Lau, New York City, NY (US); Donna Burns, Wayzata, MN (US)

(73) Assignee: Honeywell International Inc., Charlotte, NC (US)

( * ) Notice: Subject to any disclaimer, the term of this patent is extended or adjusted under 35 U.S.C. 154(b) by 83 days.

(21) Appl. No.: 16/692,740

(22) Filed: Nov. 22, 2019

(65) Prior Publication Data

US 2021/0158686 A1    May 27, 2021

(51) Int. Cl.
```
G08B 29/14       (2006.01)
G08B 17/06       (2006.01)
G05D 1/00        (2006.01)
G08B 17/107      (2006.01)
G05D 1/02        (2020.01)
```

(52) U.S. Cl.
CPC ......... *G08B 29/145* (2013.01); *G05D 1/0094* (2013.01); *G05D 1/0214* (2013.01); *G08B 17/06* (2013.01); *G08B 17/107* (2013.01); *G05D 2201/0207* (2013.01)

(58) Field of Classification Search
CPC ............... G05D 1/0094; G05D 1/0214; G05D 2201/0207; G08B 17/06; G08B 17/107; G08B 29/145; B64C 2201/12; B64C 2201/123; B64C 39/024
See application file for complete search history.

(56) References Cited

U.S. PATENT DOCUMENTS

| 3,872,315 A * | 3/1975 | Boll ..................... G01N 21/255 250/575 |
| 9,062,948 B1 | 6/2015 | Calvert |
| 9,334,051 B2 | 5/2016 | Masticola et al. |
| 10,311,710 B1 * | 6/2019 | Bart ..................... G08B 29/145 |
| 10,650,666 B1 | 5/2020 | Bart et al. |
| 10,890,910 B1 * | 1/2021 | Bart ..................... G05D 1/0094 |

(Continued)

FOREIGN PATENT DOCUMENTS

| DE | 102012003190 A1 | 8/2013 |
| WO | 2018/010915 A1 | 1/2018 |
| WO | 2018/069477 A1 | 4/2018 |

OTHER PUBLICATIONS

Smoke Detection Testing, Houston Engineering, Inc., https://www.houstoneng.com/smokedetectiontesting/, 2018, 11 pages.

*Primary Examiner* — Omeed Alizada
(74) *Attorney, Agent, or Firm* — Brooks, Cameron & Huebsch, PLLC

(57) ABSTRACT

Methods, devices, and systems for an unmanned system (US) for smoke detector testing are described herein. In some examples, one or more embodiments include a test kit, a processor, and a memory having instructions stored thereon which, when executed by the processor, cause the processor to perform a test procedure on a projected beam smoke detector in a facility using the test kit and communicate a result of the test procedure to a smoke detector network associated with the facility.

17 Claims, 6 Drawing Sheets

(56) References Cited

U.S. PATENT DOCUMENTS

| | | | |
|---|---|---|---|
| 2013/0031957 A1* | 2/2013 | Shaw | G08B 17/00 |
| | | | 73/28.01 |
| 2014/0047932 A1 | 2/2014 | Coote et al. | |
| 2014/0160473 A1* | 6/2014 | McKendree | G01N 21/532 |
| | | | 356/244 |
| 2014/0266669 A1* | 9/2014 | Fadell | G08B 19/00 |
| | | | 340/501 |
| 2018/0305010 A1 | 10/2018 | Baracaldo Angel et al. | |
| 2018/0312255 A1 | 11/2018 | Illuminati et al. | |
| 2019/0228641 A1 | 7/2019 | Lehning | |
| 2019/0248002 A1* | 8/2019 | Deyle | B25J 13/089 |

* cited by examiner

FIGURE 5B

| DEVICE ID | DEVICE TYPE | MANUFAC-TURER | MODEL # | INSTALL DATE | LOCATION | CLEAN IMAGE | DATE | TIME | PASS/FAIL | FILTER TEST 1 |
|---|---|---|---|---|---|---|---|---|---|---|
| SM45687 | SMOKE DETECTOR | ACME | 456894 | 12/1/2018 | WAREHOUSE (NORTH SIDE) | SM45687 JPEG | 12/5/2018 | 12:00 PM | PASS | PASS |
| SM98765 | SMOKE DETECTOR | ACME | 258147 | 11/15/2017 | WAREHOUSE (SOUTH SIDE) | SM98765 JPEG | 12/5/2018 | 1:30 PM | FAIL | PASS |
| SM12378 | SMOKE DETECTOR | ACME | 369852 | 6/7/2017 | OFFICES (WEST SIDE) | SM12378 JPEG | 12/5/2018 | 2:30 PM | PASS | PASS |
| --- | --- | --- | --- | --- | --- | --- | --- | --- | --- | --- |
| --- | --- | --- | --- | --- | --- | --- | --- | --- | --- | --- |
| --- | --- | --- | --- | --- | --- | --- | --- | --- | --- | --- |
| --- | --- | --- | --- | --- | --- | --- | --- | --- | --- | --- |
| --- | --- | --- | --- | --- | --- | --- | --- | --- | --- | --- |

| FILTER TEST 2 | SMOKE TEST | CLEANED? | OBSTRUCTION? | OBSTRUCTION IMAGE |
|---|---|---|---|---|
| PASS | PASS | YES | NO | SM45687OBS.JPEG |
| FAIL | FAIL | NO | YES | SM98765OBS.JPEG |
| PASS | PASS | YES | NO | SM12378OBS.JPEG |
| ... | ... | ... | ... | ... |
| ... | ... | ... | ... | ... |
| ... | ... | ... | ... | ... |
| ... | ... | ... | ... | ... |
| ... | ... | ... | ... | ... |

UNMANNED SYSTEM (US) FOR SMOKE DETECTOR TESTING

TECHNICAL FIELD

The present disclosure relates to methods, devices, and systems for an unmanned system (US) for smoke detector testing.

BACKGROUND

Facilities, such as commercial facilities, office buildings, hospitals, and the like, may have control systems that can be used during an emergency situation to manage an emergency event in and/or around the facility. Such control systems may rely on safety devices such as smoke detectors, heat detectors, carbon monoxide (CO) detectors, among other types of safety devices, to detect an emergency event.

Servicing of safety devices may be performed to ensure operation of such devices during an emergency event. For example, maintenance and/or testing of such safety devices can ensure such safety devices operate as intended in a situation in which an emergency event is taking place. Further, such servicing may be required by laws and/or other regulations in the area in which a facility including such devices is located.

BRIEF DESCRIPTION OF THE DRAWINGS

FIG. 5A illustrates a portion of an example of a smoke detector database in accordance with one or more embodiments of the present disclosure.

FIG. 5B illustrates another portion of the example of the smoke detector database in accordance with one or more embodiments of the present disclosure

DETAILED DESCRIPTION

Figure 1:
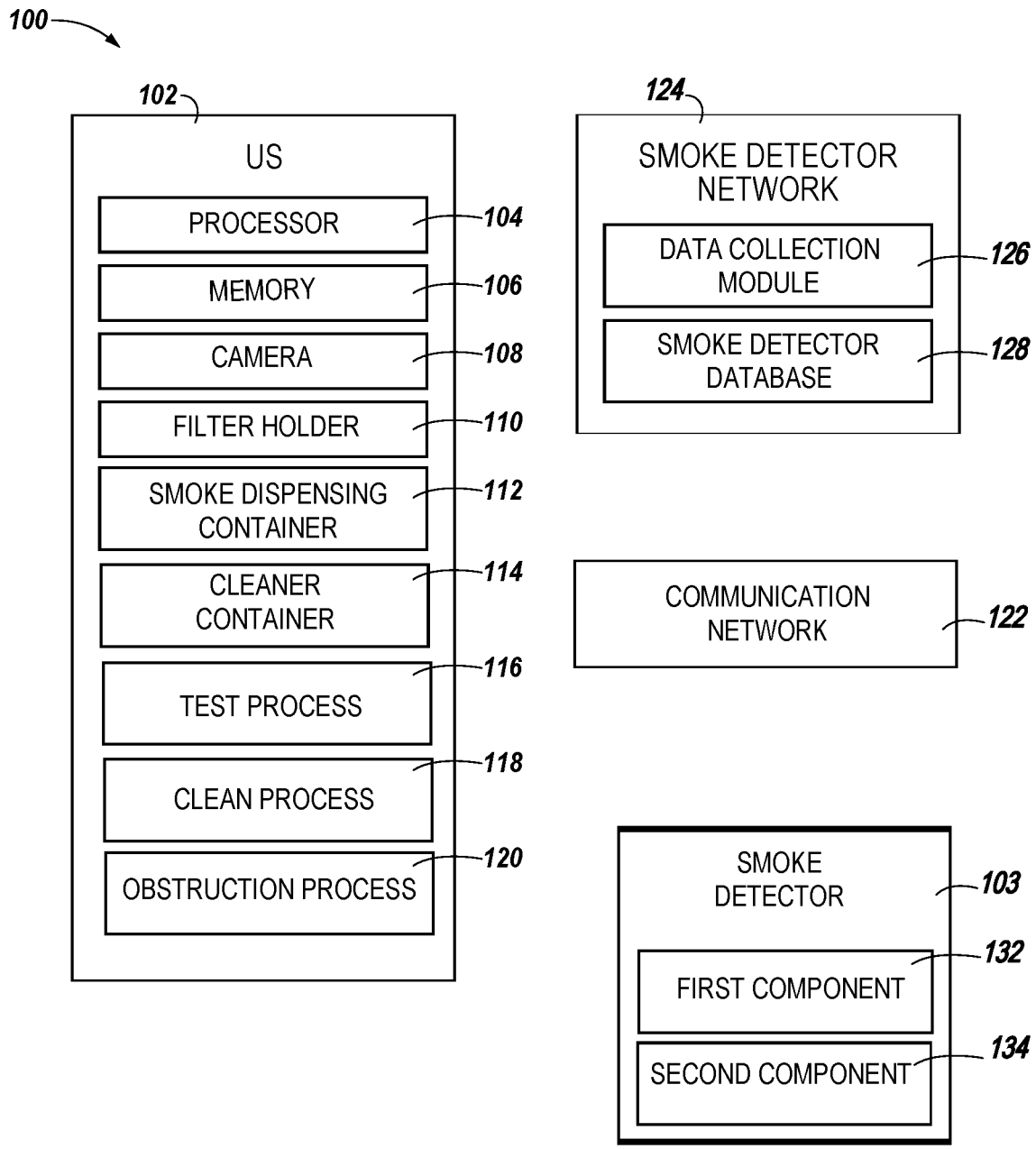
FIG. 1 is an example of a system for a US for smoke detector testing in accordance with one or more embodiments of the present disclosure.

Methods, devices, and systems for an unmanned system (US) for smoke detector testing are described herein. In some examples, one or more embodiments include a US for smoke detector testing comprising a test kit, a processor, and a memory having instructions stored thereon which, when executed by the processor, cause the processor to perform a test procedure on a projected beam smoke detector in a facility using the test kit and communicate a result of the test procedure to a smoke detector network associated with the facility.

Safety devices may be utilized in a facility to detect emergency events. As used herein, the term "safety device" refers to a device designed to detect and/or report a change in an environment in which the safety device is located. For example, safety devices may include various types of sensors to detect changes in an environment, such as a facility, which may be associated with an emergency event. The safety devices can activate in response to detection of a change in the environment in which the safety device is located. A particular example of a safety device referred to herein is a projected beam smoke detector (sometimes commonly referred to as an optical beam smoke detector). However, it is noted that safety devices can include other types of smoke detectors, heat detectors, and carbon monoxide detectors, among others.

Smoke detectors utilized in a facility may be serviced (e.g., tested) to ensure such devices can operate as intended in an emergency event. Some smoke detectors may be located in hard to reach areas. For instance, a smoke detector may be located near a ceiling. Servicing of such a smoke detector may require a technician to use a ladder or other ways to reach the smoke detector. For example, projected beam smoke detectors may be installed on high ceilings (e.g., greater than 10 feet). Servicing of such smoke detectors can pose certain risks to technicians due to the difficult to reach locations of such smoke detectors.

In some instances, a projected beam smoke detector (sometimes herein referred to simply as a "smoke detector") includes a transmitter (e.g., an infrared (IR) light transmitter) at a first location and a receiver at a second location. The receiver receives the transmitted beam and can determine a reduction in the light received. The reduction can be caused by absorbance and/or light scattering via smoke particles. In some instances, a smoke detector includes a transceiver at a first location and a reflector (e.g., a retroreflector) at a second location. The transceiver can transmit the beam, receive the reflected beam (e.g., reflected by the reflector) and can determine a reduction in the light received. In the present disclosure, reference may be made to a first component of a smoke detector and a second component of a smoke detector. In some embodiments, the first component refers to a transmitter and the second component refers to the receiver. In other embodiments, the first component refers to a transceiver and the second component refers to a reflector.

To maintain these systems in accordance with installation and maintenance requirements (e.g., National Fire Protection Association (NFPA) requirements), previous approaches utilize ladders, scissor lifts, and/or scaffolds to reach the detector components. On occasion, a test filter can be attached to a pole to reach the desired height. Projected beam smoke detectors can be tested with optical filters of various opacities to simulate an alarm level of smoke. In addition, depending upon the environment, either the first or second components may need to be cleaned of dust or dirt build up. It may also be desirable to verify that there is a clear line-of-sight between the first and second components.

A US for smoke detector testing, in accordance with the present disclosure, can allow for servicing of smoke detectors located in hard to reach areas of a facility. For instance, a US can access detector components located in areas which may pose risks for technicians to service using traditional methods, such as using a ladder. Accordingly, smoke detectors may be serviced by a US, which can reduce the risk of injury to a technician by preventing the technician from having to access smoke detectors themselves.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein particularly with respect to reference numerals in the drawings, indicates that a number of the particular feature so designated can be included with a number of embodiments of the present disclosure. This number may be the same or different between designations.

FIG. 1 is an example of a system 100 for a US for smoke detector testing in accordance with one or more embodiments of the present disclosure. In some embodiments one or more portions of the system 100 can be installed in a facility. The system 100 can include US 102, smoke detector (e.g., SD) 103, smoke detector network 124, and communication network 122.

As described above, US 102 can be utilized to service the smoke detector 103. For example, US 102 can ensure that smoke detector 103 operates as intended in a situation in which an emergency event is taking place. As used herein, the term "US" refers to vehicle without a human pilot onboard (e.g., a drone or robot).

In some examples, US 102 may be an unmanned aerial system (UAS). As used herein, the term "UAS" refers to an aircraft without a human pilot onboard. For example, the UAS can be an aircraft that can be operated autonomously and/or by remote control. US 102 can be, for example, a single rotary UAS or multi-rotor UAS such as a tricopter, quadcopter, hexacopter, octocopter, etc. In some embodiments, US 102 may include multi-rotor positioning including Quad I, Quad X, Hex I, Hex V, Hex Y, Hex IY, Oct X, Oct I, Oct V, among other examples of rotor positioning.

In some examples, US 102 may be an unmanned ground system (UGS). As used herein, the term "UGS" refers to a ground-based vehicle without a human operator onboard (e.g., a robot). For example, the UGS can be a ground-based vehicle that can be operated autonomously and/or by remote control. US 102 can be, for example, a ground-based vehicle including wheels, continuous tracks (e.g., a continuous band of treads or track plates driven by two or more wheels), among other types of ground-based vehicles.

The smoke detector 103 can include a first component 132 and a second component 134. In some embodiments, the first component 132 is an IR transmitter and the second component is an IR receiver. In some embodiments, the first component 132 is an IR transceiver and the second component 1341 is an IR reflector. The first component 132 can be located at a first position (e.g., location) in a facility and the second component 134 can be located at a second position in the facility.

US 102 can include a processor 104 and a memory 106 to perform test procedures and/or communicate results(s) of test procedures to the smoke detector network 124, as is further described herein. The memory 106 can be any type of storage medium that can be accessed by the processor 104 to perform various examples of the present disclosure. For example, the memory 106 can be a non-transitory computer readable medium having computer readable instructions (e.g., computer program instructions) stored thereon that are executable by the processor 104 for using a US for smoke detector testing in accordance with the present disclosure.

The memory 106 can be volatile or nonvolatile memory. The memory 106 can also be removable (e.g., portable) memory, or non-removable (e.g., internal) memory. For example, the memory 106 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 106 is illustrated as being located within the US 102, embodiments of the present disclosure are not so limited. For example, memory 106 can also be located internal to another computing resource (e.g., enabling computer readable instructions to be downloaded over the Internet or another wired or wireless connection).

In some examples, a particular smoke detector (e.g., smoke detector 103) can be selected for testing. The smoke detector 103 can be communicated to US 102 from a remote computing device. In some embodiments, the remote computing device is associated with the smoke detector network 124. For instance, the smoke detector 103 for testing can be communicated from the smoke detector network 124 to US 102 via a communication network 122. In some embodiments, the remote computing device may be a building management system, a building operations center, a remote server, etc. The communication network 122 can, in some examples, be a wired or wireless network. In an example of a wireless network, US 102 can include a wireless transmitter and wireless receiver to communicate wirelessly with the computing device via the network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Worldwide Interoperability for Microwave Access (WiMAX), infrared (IR) communication, Public Switched Telephone Network (PSTN), radio waves, and/or the Internet, among other types of network relationships.

The US 102 can include an imaging device (illustrated in FIG. 1 as "camera 108"). The camera 108 can be a device for recording visual images in the form of photographs, film, or video signals, for instance. The processor 104 can be configured to decode and execute any instructions received from one or more other electronic devices or server(s). The processor 104 may include one or more general-purpose processors and/or one or more special purpose processors. The processor 104 may be configured to execute one or more computer-readable program instructions, such as program instructions to carry out any of the functions described in this description. The memory 106 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The memory may comprise modules implemented as a program.

The US 102 can include a Filter Holder 110 which may be an apparatus attached to the US 102 in order to hold a filter, such as a test filter, for a projected beam smoke detector. The Filter Holder 110 may hold multiple test filters. In some embodiments, the smoke detector103 can be tested with a test filter that is not configured to generate an alarm and a test filter that is configured to generate an alarm.

The US 102 can include a Smoke Dispensing Container 112 which may include a smoke-producing chemical under pressure and a nozzle valved to release smoke from the smoke dispensing container 112. The US 102 can include a Cleaner Container 114 which may include a compressed fluid (e.g., air, liquid, etc.) can and a nozzle having a valve configured to emit and/or release the air from the Cleaner Container 114 in order to remove dust, dirt, unwanted debris, etc. from a targeted area (e.g., the first component 132 or the second component 134 of the smoke detector 103).

The Cleaner Container 114 may include a type of spray cleaner containing a sprayable liquid that is activated through a nozzle valve in order to cover the Smoke Detector 103 with the cleaning substance to remove unwanted dust, dirt, debris, etc. The US 102 can include a Test Process 116 which can dictate the type of test to be performed and the steps thereof.

In some embodiments, the test process 116 can be executed to direct the US near the first component 132 and/or second component 134 of the smoke detector 103 and moves the US 102 so that the Filter Holder 110 is between the first component 132 and the second component 134. The US 102 can determine if the smoke detector 103 passed or failed the filter test.

In some embodiments, the test process 116 can be executed to activate the smoke dispensing container 112 to release smoke in between the first component 132 and the second component 134 to determine if the smoke detector 103 passed or failed the test. The US 102 can perform test processes discussed herein. The US 102 can perform a clean process 118 and/or an obstruction process 120. In some embodiments, the clean process 118 can be executed to direct the US 102 in front of the first component 132 or the second component 134 and activate an air dispensing canister in order to remove any dust, dirt, or unwanted debris off of the detector. In some embodiments, the obstruction process 120 can be performed to determine if there are any obstructions between the first component 132 and the second component 134.

In some embodiments, the US can include A Global Positioning System (GPS), for instance, a radio navigation system that allows land, sea, and airborne entities to determine their exact location, velocity, and time, in all weather conditions, anywhere in the world. The US can include an Identification Database which can contain information corresponding to the smoke detector 103 that the US 102 is able to collect, such as serial numbers, brands, capture image, etc. Such information can be sent to the Data Collection Module 126 of the Smoke detector network 124.

In some embodiments, the US 102 can include a Guidance Module. The Guidance Module can receive inputs corresponding to maneuvers of the US 102. The maneuvers can be stored in a Guidance Database in order for the US 102 to locate the smoke detector 103 to perform a specific service and/or test. The Guidance Database can contain the specific maneuvers for the US 102 to reach a specified location of the smoke detector 103. In some embodiments, a US Controller can be operated by a user. The US Controller can be utilized to maneuver the US 102, via user inputs, for a first flight around the area. The inputs or "maneuvers" performed on the US Controller can be recorded. Such inputs can be made using an interface on the controller and can be stored in a Control Database to be sent to the Smoke Detector Network 124.

The user's inputs or maneuvers performed on the US 102 through the US Controller can be recorded and sent to a control database, for instance. The Control Database can contain the user's inputs or maneuvers on the US Controller collected via the Controller Module during the first flight of the US 102. The interface may either accept inputs (e.g., from users) or provide outputs (e.g., to users) or may perform both the actions. In one example, a user can interact with the interface using one or more user-interactive objects and devices. The user-interactive objects and devices may comprise user input buttons, switches, knobs, levers, keys, trackballs, touchpads, cameras, microphones, motion sensors, heat sensors, inertial sensors, touch sensors, etc. The interface can be implemented as a Command Line Interface (CLI), a Graphical User Interface (GUI), a voice interface, and/or a web-based user-interface, though embodiments herein are not so limited.

The Smoke detector network 124 can contain information about the various fire and smoke detectors within the facility. The Smoke detector network 124 can collect smoke detector data from manufacturers and can provide the information to the US 102. The Smoke detector network 124 can determine when the smoke detector 103 has scheduled services and can inform the US 102 to complete the test and/or safety procedures. A Data Collection Module 126 can receive information associated with the smoke detector 103 from the US 102. The Data Collection Module 126 can store the received device information in a Smoke Detector Database 128 and can send the device information to the US 102. The Smoke Detector Database 134 can contain information associated with the smoke detector 103 and can provide information to the US 102 in order to service and test the smoke detector 103.

In some embodiments, the Smoke Detector Network can include Recommendation Database containing recommendations based on the test(s) performed and the result of that testing. The recommendations can be extracted and stored in the Smoke Detector Database 128, such that all device information is stored in a central location.

A Maneuver Database of the US 102 can contain the user inputs or maneuvers inputted on the US Controller in order for the US 102 to reach the smoke detector 103 and perform the desired services and/or tests. In some embodiments, the US 102 may use video collected from the camera 108 in order to direct the US 102 to the smoke detector 103. In some embodiments, this video data may be stored in the Maneuver Database for training the US 102, using machine learning, to identify potential safety issues.

Figure 2:
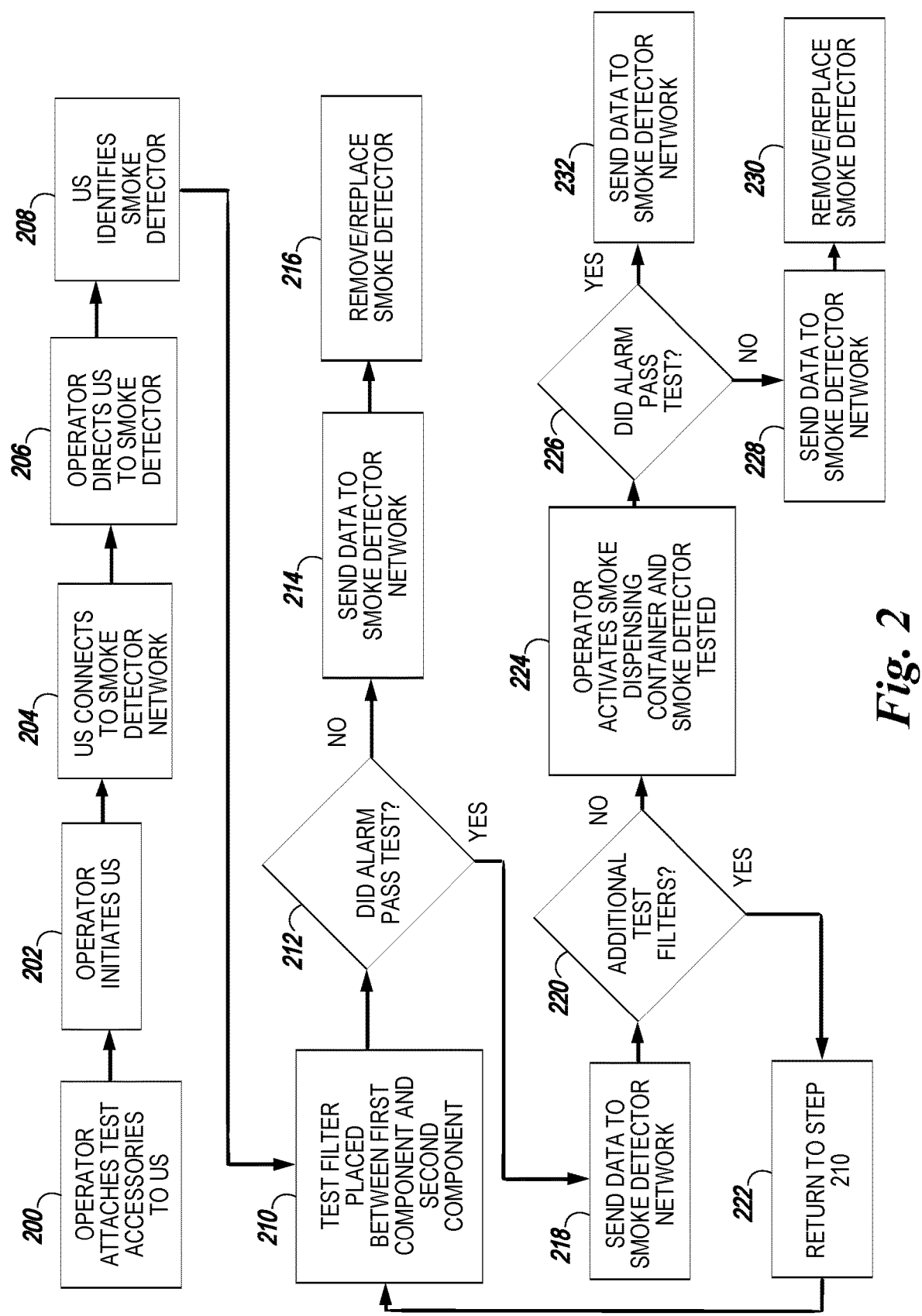
FIG. 2 illustrates a flow chart associated with smoke detector testing in accordance with one or more embodiments of the present disclosure.

FIG. 2 illustrates a flow chart associated with smoke detector testing in accordance with one or more embodiments of the present disclosure. In some embodiments, a test kit, including test accessories, can be attached to the US, at step 200. As used herein, the term "test kit" refers to a system including components (e.g., accessories) designed to provide a detectable change in an environment to cause a response from a smoke detector. For example, the test kit included on US 102 can perform a particular action to cause a detectable change in an environment so as to cause a smoke detector to detect the change in the environment caused by the particular action performed by the test kit, as is further described herein.

US 102 can initiate a testing of the smoke detector 103 using the test kit. US 102 can initiate testing of smoke detector 103 by using the test kit included in US 102 to cause the smoke detector to activate. For instance, the test kit can perform a particular action to cause a detectable change in the smoke detector 103 to test smoke detector 103 (e.g., determine whether the smoke detector activates in response to the detectable change). That is, US 102 can use the test kit to determine whether smoke detector 103 can detect the change in the environment caused by the test kit included on US 102.

In some embodiments, the test kit includes various optical filters of different opacities. In some embodiments the test kit includes one or more canisters to provide a smoke simulation. In some embodiments, the test kit includes compressed fluid to clean the component(s) of a smoke detector. With reference to the example illustrated in FIG. 1, a test kit of the US 102 can include the camera 108, the filter holder 110, and the smoke dispensing container 112. It is noted, however, that test kits in accordance with the present disclosure are not limited to a particular quantity or type of accessories.

In some embodiments, there may be a combination of test filters configured to activate an alarm and test filters not configured to activate the alarm. In Some embodiments, instead of using compressed air to clean the component(s) of the smoke detector there may be a maneuver that the US may perform to direct airflow from the propeller(s) towards the component(s) in order to clean it from dust or debris.

At 202, the operator initiates or starts up the US. The US connects to the Smoke Detector Network at step 204. The operator directs the US to the smoke detector to be tested, at 206. At 208, the US identifies the smoke detector. Identification can be accomplished by locating a serial number on the smoke detector by using the camera on the US. In some embodiments, the operator may input the smoke detector device ID on a controller GUI, etc. At 210, a test filter is placed in between the first component of the smoke detector and the second component of the smoke detector (specifically, in the example illustrated in FIG. 2, the first component is a smoke detector transceiver and the second component is a smoke detector reflector), and the smoke detector is tested. At 212, it can be determined if the smoke detector alarm passed the test. Determining whether a detector passes or fails can be accomplished by the operator inputting an indication of pass or fail into a controller GUI, using an audio detector on the US to determine if the alarmed sounded, etc. If the alarm did not pass the test data indicating failure can be sent to the Smoke Detector Network at step 214, and, at 216, the operator can remove or replace the smoke detector. If the alarm did pass the test, data indicating passage can be sent to the Smoke Detector Network at step 218. A determination can then be made whether there are any additional test filters to be tested, at step 220. If there are additional test filters to be used, at 222, the process can return to step 210. If there are no additional test filters the Smoke Dispensing Container can be activated at 224. The smoke dispensing container can be used to imitate smoke to determine if the smoke detector can recognize that there is smoke in the air and to sound the alarm. At 226, a determination can be made whether the alarm passed the smoke detecting test. If the alarm did not pass the test, data indicating failure can be sent to the Smoke Detector Network, at step 228, and, at 230, the operator can remove or replace the smoke detector. If the alarm did pass the test, data indicating passage can be sent to the Smoke Detector Network, at step 232.

Figure 3:
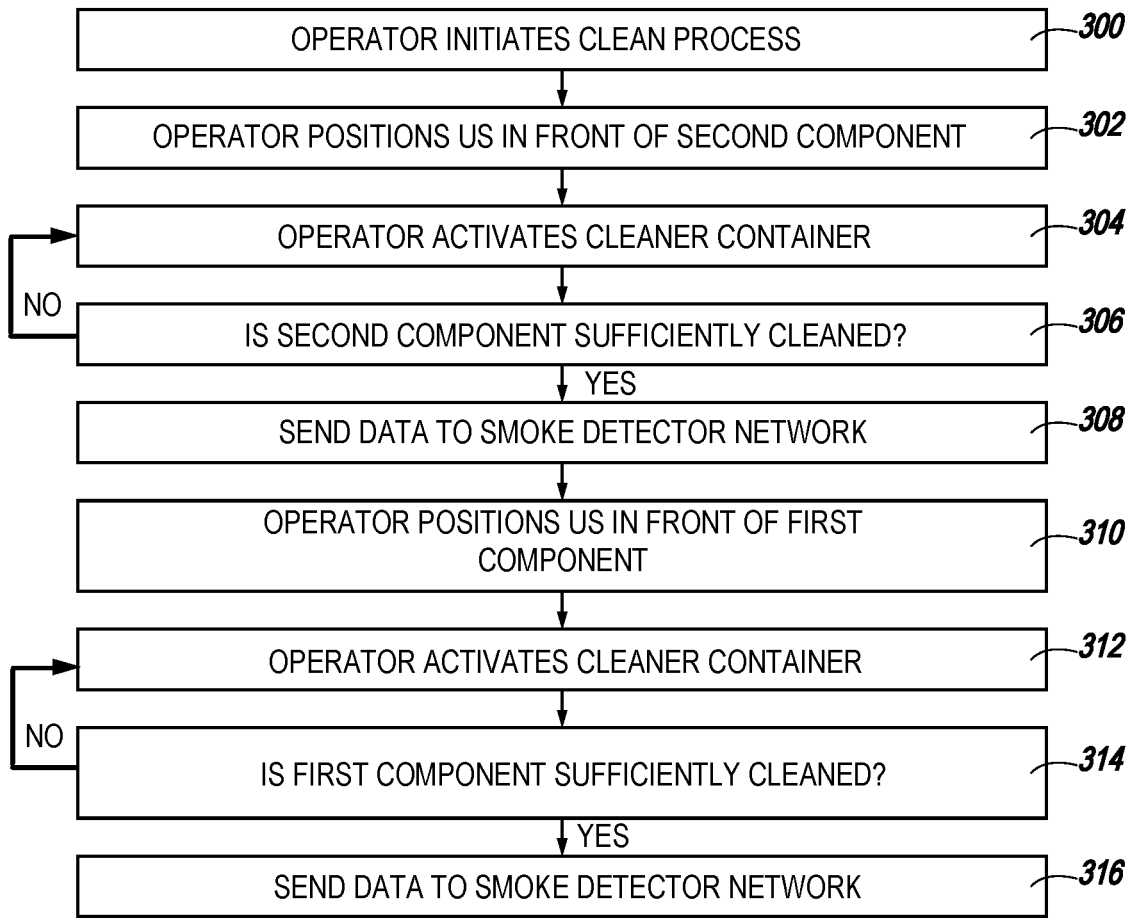
FIG. 3 illustrates another flow chart associated with smoke detector testing in accordance with one or more embodiments of the present disclosure.

FIG. 3 illustrates another flow chart associated with smoke detector testing in accordance with one or more embodiments of the present disclosure. The process illustrated in FIG. 3 may be referred to herein as a "clean process." At 300, the operator can initiate the Clean Process once the Test Process is complete. At 302, the operator can position the drone in front of the first component of the smoke detector (the transceiver, in this example). Positioning can be accomplished by using the camera to assist the operator in guiding the US. At 304, the operator can activate the Cleaner Container, which can blow compressed air directly at the first component removing dirt, dust, debris, etc., off the first component.

In some embodiments, the US itself may be used to produce enough airflow from the propeller(s) in order to clean off the first component. In some embodiments, a Cleaner Container may also include a type of spray cleaner which could contain a sprayable liquid that is activated through a nozzle valve in order to cover the first component with the cleaning substance to remove unwanted dust, dirt, debris, etc. from a targeted area. At 306, a determination can be made regarding whether the first component is sufficiently cleaned. Such a determination can be made using the camera on the US. In some embodiments, operator visualization and approval can indicate sufficient cleaning. In some embodiments, a debris recognition system can be used, which may capture an image of the smoke detector first component and compare it to an image of the smoke detector first component when the device was installed. If it is determined that the smoke detector first component is not cleaned the process can return to step 304.

If the smoke detector first component is determined to be sufficiently cleaned, data indicating this determination can be sent, at 308, to the Smoke Detector Network. At 310, the operator can position the US in front of the second component of the smoke detector (a reflector, in this example). Positioning can be accomplished by using the camera to assist the operator in guiding the US. At 312, the operator can activate the Cleaner Container, which can blow compressed air directly at the second component removing dirt, dust, debris, etc., off the first component.

In some embodiments, the US itself may be used to produce enough airflow from the propeller(s) in order to clean off the second component. In some embodiments, a Cleaner Container may also include a type of spray cleaner which could contain a sprayable liquid that is activated through a nozzle valve in order to cover the second component with the cleaning substance to remove unwanted dust, dirt, debris, etc. from a targeted area. At 314, a determination can be made regarding whether the second component is sufficiently cleaned. Such a determination can be made using the camera on the US. In some embodiments, operator visualization and approval can indicate sufficient cleaning. In some embodiments, a debris recognition system can be used, which may capture an image of the smoke detector second component and compare it to an image of the smoke detector second component when the device was installed. If it is determined that the smoke detector second component is not cleaned the process can return to step 312. If the smoke detector second component is determined to be sufficiently cleaned, data indicating this determination can be sent, at 316, to the Smoke Detector Network.

Figure 4:
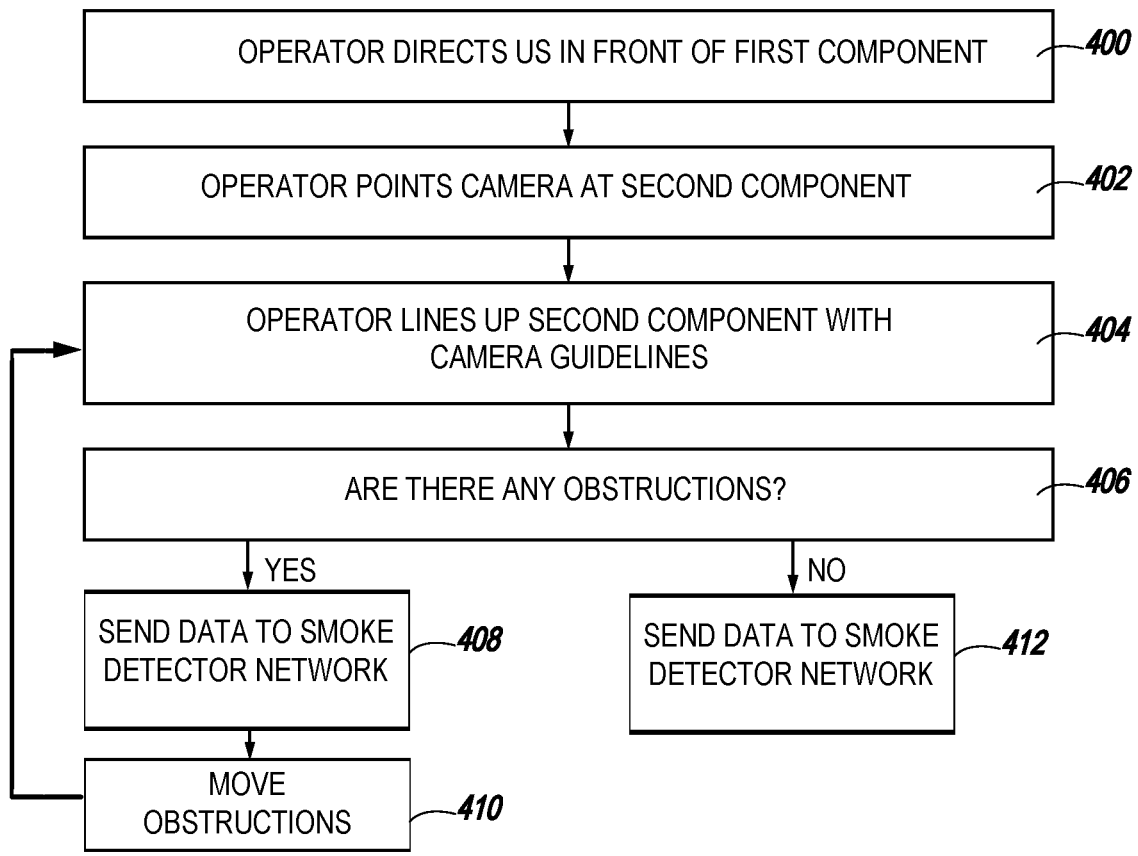
FIG. 4 illustrates another flow chart associated with smoke detector testing in accordance with one or more embodiments of the present disclosure.

FIG. 4 illustrates another flow chart associated with smoke detector testing in accordance with one or more embodiments of the present disclosure. The process illustrated in FIG. 4 can be an "obstruction process" as described herein. At 400, the US can be directed to a position in front of the smoke detector first component. At 402, the camera of the US can be pointed at the second component of the smoke detector. At 404, the operator, using the US camera, can use guidelines on the camera to determine that the second component is aligned correctly. Once the camera is aligned with the reflector, a determination can be made, at 406, regarding whether there are any obstructions in between the first component and the second component. If, at 408, it is determined that there is an obstruction, data indicating the obstruction can be sent to the Smoke Detector Network. At 410, the operator can eliminate and/or reposition the obstruction(s) and the process can return to 404. If it is determined that there are no obstructions, data indicating this determination can be is sent to the Smoke Detector Network, at 412.

A data collection module of the smoke detector network (e.g., the data collection module 126, previously described in connection with FIG. 1) can receive the results of the tests performed on the smoke detector. The data collection module can receive the results of the clean process. The data collection module can receive the results of the obstruction process. The results can be stored in a smoke detector database (e.g., the smoke detector database 128, previously described in connection with FIG. 1).

FIG. 5A illustrates a portion of an example of a smoke detector database 528 in accordance with one or more embodiments of the present disclosure. FIG. 5B illustrates another portion of the example of the smoke detector database 528 in accordance with one or more embodiments of the present disclosure. FIGS. 5A and 5B are cumulatively referred to herein as "FIG. 5."

The Smoke Detector Database 528 can be created through the Data Collection Module in the Smoke Detector Network, which connects to the US and receives data collected from the US or inputted by an operator on a controller GUI. As shown in FIG. 5, the database 528 can include the device ID, date, time, the device type, the location of the device, whether the device failed or passed the testing, the test results of different test filters, (e.g., test filter 1, test filter 2, test filter 3, etc.) results of the smoke test, whether the device was cleaned, an image of the clean device, whether the device was obstructed in some way, and an image of the obstruction (if any). It is noted that smoke detector databases in accordance with the present disclosure are not limited to the particular type(s) of information shown in FIG. 5. In some embodiments the received images, such as the clean image, obstruction image, etc. may be compared to previously stored images such as images taken during the installation, previous clean images, obstruction images, etc., in order to determine if the device has moved from its previous position.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An unmanned system (US) for smoke detector testing, comprising:
a test kit, wherein the test kit includes a plurality of optical filters, each having a different opacity;
a processor; and
a memory having instructions stored thereon which, when executed by the processor, cause the processor to:
perform a test procedure on a projected beam smoke detector in a facility using the test kit, wherein one of the plurality of optical filters of the test kit has an opacity insufficient to cause the smoke detector to generate an alarm; and
communicate a result of the test procedure to a smoke detector network associated with the facility.

2. The US of claim 1, wherein the test kit includes a smoke generating device.

3. The US of claim 1, wherein the test kit includes a camera.

4. The US of claim 1, wherein the instructions to perform the test procedure include instructions to position an optical filter of the plurality of optical filters between a first component of the smoke detector and a second component of the smoke detector.

5. The US of claim 1, wherein the instructions to perform the test procedure include instructions to generate smoke proximal to a component of the smoke detector.

6. The US of claim 1, wherein the instructions to perform the test procedure include instructions to determine an obstruction between a first component of the smoke detector and a second component of the smoke detector.

7. The US of claim 1, further comprising instructions to cause the US to emit a fluid configured to clean a component of the smoke detector.

8. A method for smoke detector testing, comprising:
performing a test procedure on a projected beam smoke detector using a test kit mounted on an unmanned system (US), wherein the test kit includes a plurality of optical filters, each having a different opacity, and wherein one of the plurality of optical filters has an opacity insufficient to cause the smoke detector to generate an alarm;
communicating a result of the test procedure to the smoke detector network; and
storing the result of the test procedure by the smoke detector network.

9. The method of claim 8, wherein the method includes communicating the result of the test procedure to the smoke detector network by the US.

10. The method of claim 8, wherein the method includes communicating the result of the test procedure to the smoke detector network by the smoke detector.

11. The method of claim 8, wherein the method includes storing the result of the test procedure in association with:
   a device identifier of the smoke detector;
   a type of the smoke detector;
   a manufacturer of the smoke detector;
   a model number of the smoke detector;
   an installation date of the smoke detector; and
   a location of the smoke detector.

12. The method of claim 8, wherein the method includes storing the result of the test procedure in association with:
   a date of the performance of the test procedure;
   a time of the performance of the test procedure; and
   a description of the test procedure.

13. The method of claim 8, wherein the method includes determining a recommendation associated with the smoke detector responsive to a determination that the result of the test procedure includes the smoke detector failing the test procedure.

14. A system for smoke detector testing, comprising:
   an unmanned system (US) having a test kit, wherein the test kit includes a plurality of optical filters, each having a different opacity;
   a projected beam smoke detector having a first component at a first location in a facility and a second component at a second location in the facility; and
   a remote computing device of a smoke detector network configured to:
      receive a result of a test procedure performed on the smoke detector using the test kit, wherein one of the plurality of optical filters of the test kit has an opacity insufficient to cause the smoke detector to generate an alarm; and
      store the result of the test procedure by the smoke detector network.

15. The system of claim 14, wherein the first component includes an optical transmitter, and wherein the second component includes an optical receiver.

16. The system of claim 14, wherein the first component includes an optical transceiver, and wherein the second component includes an optical reflector.

17. The system of claim 14, wherein:
   the US is an unmanned ground system (UGS);
   the UGS includes an extension mechanism connected to the test kit; and
   the US is configured to position the test kit in proximity with the first component of the smoke detector via the extension mechanism prior to initiating the testing of the smoke detector.

\* \* \* \* \*